United States Patent
Tseng et al.

(10) Patent No.: US 9,609,512 B2
(45) Date of Patent: Mar. 28, 2017

(54) WIRELESS AUTHENTICATION SYSTEM AND WIRELESS AUTHENTICATION METHOD

(71) Applicant: Userstar Information System Co., Ltd, Chiayi County (TW)

(72) Inventors: Yin-Hung Tseng, Chiayi County (TW); Chung-Ming Lin, Chiayi County (TW); Sheng-Chang Liu, Chiayi County (TW)

(73) Assignee: USERSTAR INFORMATION SYSTEM CO., LTD., Chiayi County (TW)

( * ) Notice: Subject to any disclaimer, the term of this patent is extended or adjusted under 35 U.S.C. 154(b) by 43 days.

(21) Appl. No.: 14/510,169

(22) Filed: Oct. 9, 2014

(65) Prior Publication Data

US 2015/0026783 A1 Jan. 22, 2015

(51) Int. Cl.
*G06F 7/04* (2006.01)
*H04W 12/06* (2009.01)
*H04L 29/06* (2006.01)
*H04W 12/12* (2009.01)

(52) U.S. Cl.
CPC ......... *H04W 12/06* (2013.01); *H04L 63/0846* (2013.01); *H04L 63/1475* (2013.01); *H04W 12/12* (2013.01)

(58) Field of Classification Search
CPC ......... G06F 21/30; G06F 21/44; H04L 9/0813
USPC .......... 713/155, 168, 184; 726/6, 19; 380/44
See application file for complete search history.

(56) References Cited

U.S. PATENT DOCUMENTS

| | | | | |
|---|---|---|---|---|
| 7,315,950 B1 * | 1/2008 | Baransky | ............... | G06F 21/10 713/193 |
| 7,409,552 B2 * | 8/2008 | Buttyan | ............... | G06Q 20/20 380/259 |
| 7,552,467 B2 * | 6/2009 | Lindsay | ............... | G06F 21/31 713/165 |
| 7,693,313 B2 * | 4/2010 | Ehlers | ............... | G06K 9/00013 382/124 |
| 8,341,397 B2 * | 12/2012 | Leedom, Jr. | .......... | H04L 63/068 705/44 |

(Continued)

FOREIGN PATENT DOCUMENTS

| | | |
|---|---|---|
| CN | 200810111471.4 | 6/2008 |
| CN | 201110053293.6 | 3/2011 |
| TW | 099123662 | 7/2010 |

*Primary Examiner* — Dede Zecher
*Assistant Examiner* — Viral Lakhia
(74) *Attorney, Agent, or Firm* — Raymond Y. Chan; David and Raymond Patent Firm

(57) ABSTRACT

A wireless authentication system includes an execution end device and a control end device. When the execution end device and the control end device receive an activation signal, the execution end device generates a time related random code, and transmits the time related random code to the control end device; and the control end device generates a comparison authentication code according to the time related random code, a fixed password and a variable password. When the execution end device determines that the comparison authentication code corresponds to a set of data stored in the execution end device, the execution end device performs a predetermined operation, and the variable password is changed.

9 Claims, 4 Drawing Sheets

(56) References Cited

U.S. PATENT DOCUMENTS

| | | | | |
|---|---|---|---|---|
| 8,639,925 B2* | 1/2014 | Schuetze | ............... | H04L 9/002 713/168 |
| 8,832,807 B1* | 9/2014 | Kuo | ............... | G06F 21/45 713/183 |
| 2010/0239087 A1* | 9/2010 | Chaisson | ............... | G06F 21/46 380/44 |
| 2011/0283106 A1* | 11/2011 | Cui | ............... | H04L 63/08 713/168 |
| 2012/0017080 A1* | 1/2012 | Liu | ............... | H04L 9/0838 713/155 |
| 2012/0019379 A1* | 1/2012 | Ben Ayed | ............... | G08B 13/1436 340/539.1 |
| 2012/0060215 A1* | 3/2012 | Cui | ............... | H04W 12/06 726/19 |
| 2012/0072718 A1* | 3/2012 | Ronda | ............... | H04L 63/0853 713/156 |
| 2012/0278490 A1* | 11/2012 | Sennett | ............... | H04W 4/005 709/227 |
| 2013/0104198 A1* | 4/2013 | Grim | ............... | H04L 63/08 726/4 |

* cited by examiner

WIRELESS AUTHENTICATION SYSTEM AND WIRELESS AUTHENTICATION METHOD

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a wireless authentication system and a wireless authentication method, and more particularly, to a wireless authentication system and a wireless authentication method capable of enhancing authentication security.

Description of Related Arts

As related technology keeps improving, different kinds of authentication methods are developed for protecting a particular device or information from being stolen or misappropriated. Generally, password authentication methods comprise static password authentication and dynamic password authentication. In contrast to the static password authentication using a fixed password, the dynamic password authentication uses a variable password to protect data, and the variable password is changed every time when a protection mechanism is deactivated, so as to enhance authentication security. However, when an electronic device (such as a mobile phone) is used to deactivate a protection mechanism of a protected device, the variable password will be transmitted between the electronic device and the protected device wirelessly, such that the variable password is easy to be intercepted. Therefore, the authentication method of the prior art can not effectively protect the particular device or information from being stolen or misappropriated.

SUMMARY OF THE PRESENT INVENTION

The present invention provides a wireless authentication system and a wireless authentication method capable of enhancing authentication security in order to solve problems of the prior art.

The wireless authentication system of the present invention comprises an execution end device and a control end device. The execution end device comprises a first wireless module and a first control unit coupled to the first wireless module. The control end device comprises a second wireless module and a second control unit coupled to the second wireless module. Wherein, when the first wireless module receives an activation signal, the first control unit generates a time related random code, and the first control unit transmits the time related random code to the second wireless module via the first wireless module; wherein when the second wireless module receives the activation signal and the time related random code, the second control unit generates a comparison authentication code according to the time related random code, a fixed password and a variable password, and transmits the comparison authentication code to the first wireless module via the second wireless module; and wherein when the first control unit determines that the comparison authentication code corresponds to a set of data stored in the execution end device, the first control unit performs a predetermined operation, and the variable password is changed.

The wireless authentication method of the present invention comprises providing an execution end device comprising a first wireless module and a first control unit coupled to the first wireless module; providing a control end device comprising a second wireless module and a second control unit coupled to the second wireless module; transmitting an activation signal to the first wireless module and the second wireless module; when the first wireless module receives the activation signal, the first control unit generating a time related random code and transmitting the time related random code to the second wireless module via the first wireless module; when the second wireless module receives the activation signal and the time related random code, the second control unit generating a comparison authentication code according to the time related random code, a fixed password and a variable password, and transmitting the comparison authentication code to the first wireless module via the second wireless module; the first control unit determining whether the comparison authentication code corresponds to a set of data stored in the execution end device; and when the first control unit determines that the comparison authentication code corresponds to the set of data stored in the execution end device, the first control unit executing a predetermined operation, and the variable password being changed.

These and other objectives of the present invention will no doubt become obvious to those of ordinary skill in the art after reading the following detailed description of the preferred embodiment that is illustrated in the various figures and drawings.

DETAILED DESCRIPTION OF THE PREFERRED EMBODIMENT

Figure 1:
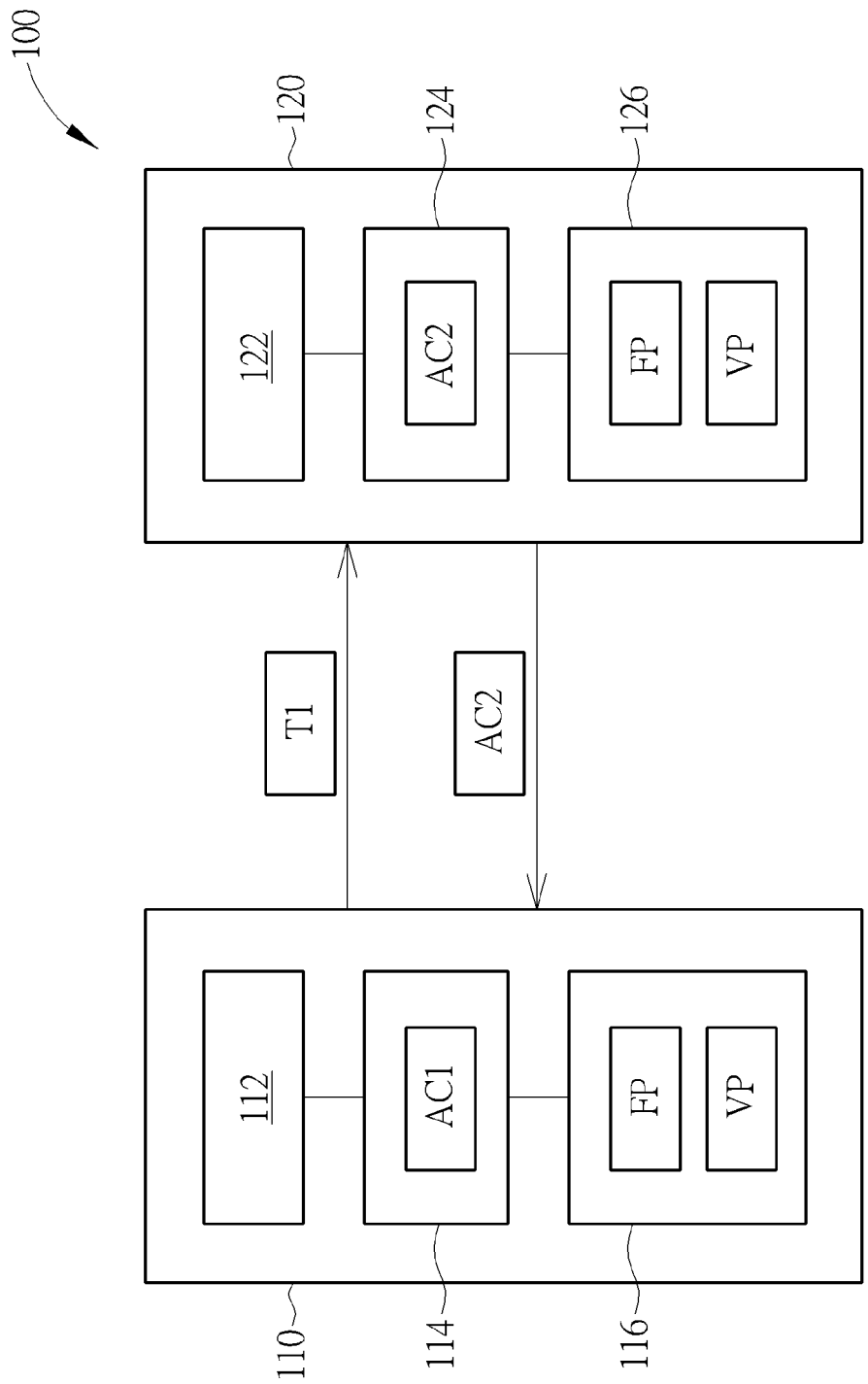
FIG. 1 is a diagram showing a wireless authentication system according to a first embodiment of the present invention.

Please refer to FIG. 1. FIG. 1 is a diagram showing a wireless authentication system according to a first embodiment of the present invention. As shown in FIG. 1, the wireless authentication system 100 of the present invention comprises an execution end device 110 and a control end device 120. The execution end device 110 comprises a first wireless module 112, and a first control unit 114 coupled to the first wireless module 112. The control end device 120 comprises a second wireless module 122, and a second control unit 124 coupled to the second wireless module 122. The first wireless module 112 and the second wireless module 122 can communicate with each other by wireless signals, such as (but not limited to) wireless signals of infrared, Bluetooth, radio frequency (RF), or near field communication (NFC). In addition, the execution end device 110 further comprises a first memory unit 116 for storing a fixed password FP and a variable password VP. The control end device 120 further comprises a second memory unit 126 for storing the fixed password FP and the variable password VP. The fixed password FP and the variable password VP stored in the first memory unit 116 are respectively identical to the fixed password FP and the variable password VP stored in the second memory unit 126. The fixed password FP is inputted while a user sets the wireless authentication system 100, and the fixed password FP is not changeable. The variable password VP is generated while the user sets the wireless authentication system 100, and the variable password VP is changed after every time the execution end device 110 performs a predetermined operation.

Figure 2:
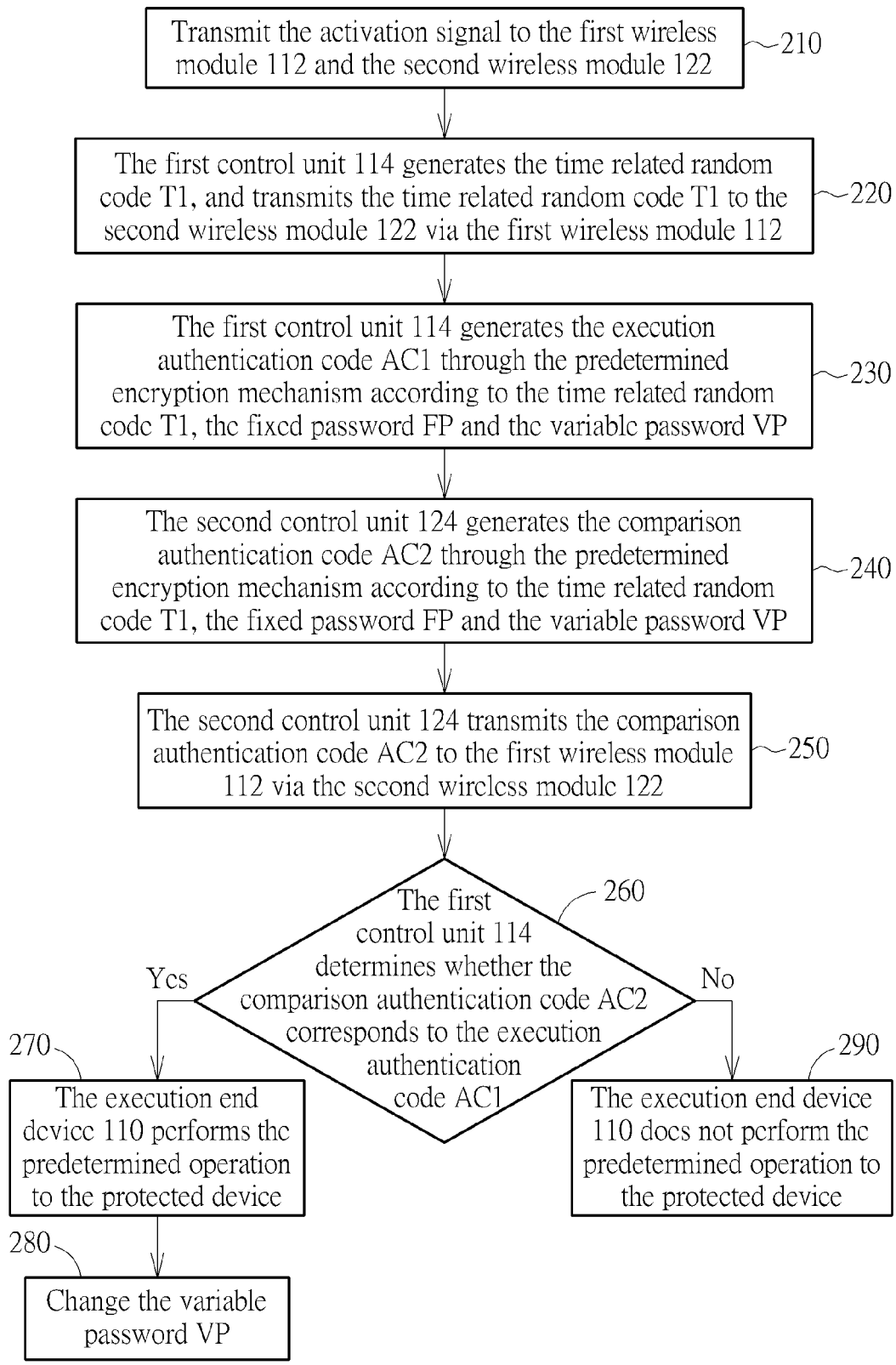
FIG. 2 is a flowchart showing a wireless authentication method of the present invention.

Please refer to FIG. 2, and refer to FIG. 1 as well. FIG. 2 is a flowchart showing a wireless authentication method of the present invention. In the present embodiment, the execution end device 110 can be (but not limited to) a lock, and the control end device 120 can be (but not limited to) a mobile phone. As shown in FIG. 2, in Step 210, when the user utilizes the control end device 120 for notifying the execution end device 110 to perform a predetermined operation to unlock a protected device (not shown), the user can press an activation button (not shown) to generate an activation signal which will be transmitted to the first wireless module 112 and the second wireless module 122. The protected device can be a vehicle, such as a car, a motorcycle, or a bicycle. The activation button can be (but not limited to) a button arranged on the protected device. In Step 220, when the first wireless module 112 receives the activation signal, the first control unit 114 generates a time related random code T1, and the first control unit 114 transmits the time related random code T1 to the second wireless module 122 via the first wireless module 112. In Step 230, the first control unit 114 generates an execution authentication code AC1 through a predetermined encryption mechanism according to the time related random code T1, the fixed password FP and the variable password VP, and store the execution authentication code AC1 in the first memory unit 116. In other embodiments of the present invention, the first control unit 114 does not necessarily generate the execution authentication code AC1. In Step 240, when the second wireless module 122 receives the activation signal and the time related random code T1, the second control unit 124 generates a comparison authentication code AC2 through the predetermined encryption mechanism according to the time related random code T1, the fixed password FP and the variable password VP. The predetermined encryption mechanism for generating the execution authentication code AC1 can be identical to or different from the predetermined encryption mechanism for generating the comparison authentication code AC2. In Step 250, the second control unit 124 transmits the comparison authentication code AC2 to the first wireless module 112 via the second wireless module 122. In Step 260, the first control unit 114 determines whether the comparison authentication code AC2 corresponds to the execution authentication code AC1. When the control unit 114 determines that the comparison authentication code AC2 corresponds to the execution authentication code AC1, it means the control end device 120 passes the authentication, and the execution end device 110 performs the predetermined operation to unlock the protected device in step 270. When the first control unit 114 determines that the comparison authentication code AC2 does not correspond to the execution authentication code AC1, the execution end device 110 does not perform the predetermined operation to unlock the protected device in step 290. Furthermore, in Step 280, after the execution end device 110 performs the predetermined operation to unlock the protected device, the variable password VP is changed.

In addition, in other embodiments of the present invention, when the first wireless module 112 receives the comparison authentication code AC2, the first control unit 114 can decrypt the comparison authentication code AC2 in order to obtain a decrypted time related random code, a decrypted fixed password and/or a decrypted variable password. The first control unit 114 then determines whether the decrypted time related random code, the decrypted fixed password and/or the decrypted variable password respectively correspond to the time related random code T1, the fixed password FP and/or the variable password VP stored in the execution end device 110. When the first control unit 114 determines that the decrypted time related random code, the decrypted fixed password and/or the decrypted variable password respectively correspond to the time related random code T1, the fixed password FP and/or the variable password VP stored in the execution end device 110, the first control unit 114 performs the predetermined operation, and the variable password VP is changed.

In summary, when the first control unit 114 determines that the comparison authentication code AC2 corresponds to a set of data stored in the execution end device 110, such as the execution authentication code AC1, the time related random code T1, the fixed password FP and/or the variable password VP, the first control unit 114 performs a predetermined operation.

In the present embodiment, the variable password VP is changed by the first control unit 114, and the first control unit 114 then transmits the changed variable password VP to the second wireless module 122 via the first wireless module 112, such that the first memory unit 116 and the second memory unit 126 can store the changed variable password VP respectively, for performing the predetermined operation to unlock the protected device next time.

However, in other embodiments of the present invention, the variable password VP can also be changed by the second control unit 124, and the second control unit 124 then transmits the changed variable password VP to the first wireless module 112 via the second wireless module 122, such that the first memory unit 116 and the second memory unit 126 can store the changed variable password VP respectively, for performing the predetermined operation to unlock the protected device next time.

On the other hand, the time related random code T1 generated by the first control unit 114 is a random number comprising a first time information. The first time information corresponds to time when generating the time related random code T1. Since the comparison authentication code AC2 is generated according to the time related random code T1, the comparison authentication code AC2 comprises a second time information. The wireless authentication method of the present invention can further comprises the first control unit 114 determining whether the first time information of the time related random code T1 is consistent with the second time information of the comparison authentication code AC2. When the first time information of the time related random code T1 is consistent with the second time information of the comparison authentication code AC2, it means that the comparison authentication code AC2 is not fake.

Moreover, the first control unit 114 can further determine whether transmission time of the comparison authentication code AC2 expires according to the first time information of the time related random code T1 and receiving time of the comparison authentication code AC2. If the first control unit 114 determines that the transmission time of the comparison authentication code AC2 expires, it means that the comparison authentication code AC2 is possibly fake, even though the comparison authentication code AC2 corresponds to the execution authentication code AC1. When the first control unit 114 determines that the comparison authentication code AC2 is fake, the execution end device 110 does not perform the predetermined operation to unlock the protected device.

In addition, in Step 230, the execution authentication code AC1 can be generated through the predetermined encryption mechanism according to the time related random code T1, a non-time-related random code (not shown), the fixed password FP and the variable password VP; and in Step 240, the comparison authentication code AC2 can be also generated through the predetermined encryption mechanism according to the time related random code T1, the non-time-related random code, the fixed password FP and the variable password VP. The non-time-related random code is a random number without comprising any time information. The non-time-related random code can be generated by the first control unit 114 or the second control unit 124. When the first control unit 114 generates the non-time-related random code, the first control unit 114 transmits the non-time-related random code to the second wireless module 122 via the first wireless module 112. When the second control unit 124 generates the non-time-related random code, the second control unit 124 transmits the non-time-related random code to the first wireless module 112 via the second wireless module 122.

In order to further enhance authentication security, the wireless authentication method of the present invention can further comprise authenticating an identity number of the control end device 120. For example, when the control end device 120 is a mobile phone, the second control unit 124 transmits an international mobile equipment identity number (IMEI) of the control end device 120 to the first wireless module 112 via the second wireless module 122. The first control unit 114 further determines whether the international mobile equipment identity number of the control end device 120 corresponds to a predetermined international mobile equipment identity number stored in the execution end device 110. When the first control unit 114 determines that the international mobile equipment identity number of the control end device 120 does not correspond to the predetermined international mobile equipment identity number stored in the execution end device 110, it means that the control end device 120 is not a predetermined mobile phone. Therefore, the first control unit 114 does not perform the predetermined operation to unlock the protected device.

In addition, in the above embodiment, the fixed password FP and the variable password VP stored in the first memory unit 116 are identical to the fixed password FP and the variable password VP stored in the second memory unit 126. But in other embodiments of the present invention, the second control unit 124 can further encrypt the variable password VP according to a personal password and store the encrypted variable password VP in the second memory unit 126. When the second control unit 124 starts to generate the comparison authentication code AC2, the second control unit 124 decrypts the encrypted variable password VP stored in the second memory unit 126 in order to obtain the variable password VP.

In summary, the wireless authentication method of the present invention performs the authentication according to the execution authentication code AC1 and the comparison authentication code AC2 generated by the time related random code T1, the fixed password FP and the variable password VP. The fixed password FP is inputted while the user sets the wireless authentication system 100, and is not transmitted while the above wireless authentication method is performed. Therefore, the fixed password FP can be prevented from being intercepted. The variable password VP is changed after every time the execution end device 110 performs the predetermined operation. Therefore, the password of the authentication can be prevented from being cracked. The time related random code T1 can be used for determining whether the comparison authentication code AC2 is fake, and the time related random code T1 can be further used for determining whether the comparison authentication code AC2 exceeds a valid time. Therefore, the wireless authentication method of the present invention can effectively enhance the authentication security, so as to prevent the protected device from being stolen or misappropriated.

According to the above arrangement, the user can use a mobile phone or other kind of mobile device as a key for unlocking, such as using the mobile phone for starting a car. The protected device can be unlocked only by the mobile phone of the user. Furthermore, the predetermined operation performed by the execution end device 110 is not limited to unlocking the protected device. The execution end device 110 can perform different predetermined operations according to design or user requirement.

Figure 3:
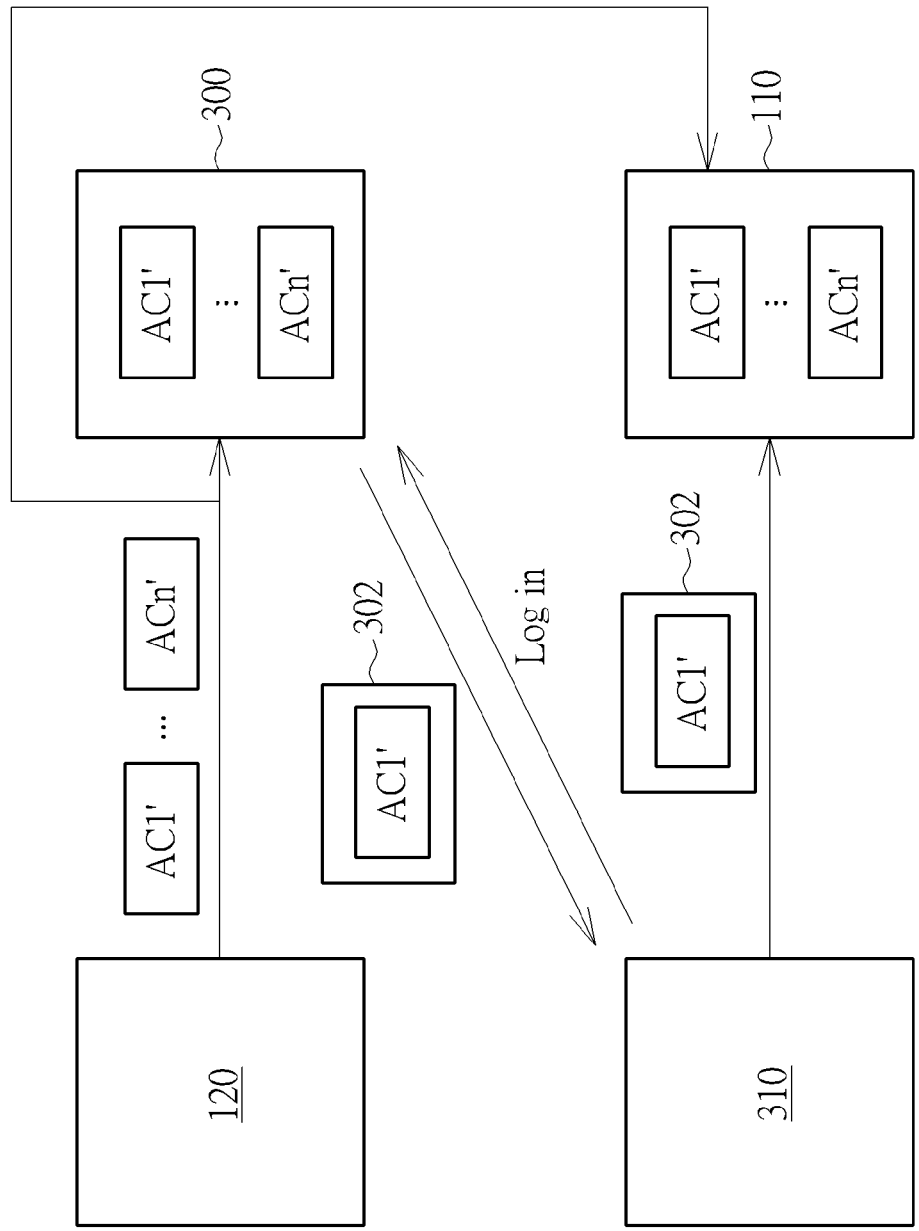
FIG. 3 is a diagram showing the wireless authentication method performing a predetermined operation according to a backup comparison authentication code.

Please refer to FIG. 3, and refer to FIG. 1 as well. FIG. 3 is a diagram showing the wireless authentication method performing a predetermined operation according to a backup comparison authentication code. As shown in FIG. 3, when the user lends the protected device to a borrower, the user may use the control end device 120 to generate at least one backup comparison authentication code AC1'~ACn', and the control end device 120 can transmit the at least one backup authentication code AC1'~ACn' to a cloud server 300 and the execution end device 110 for storing the at least one backup authentication code AC1'~ACn' in the cloud server 300 and the execution end device 110. The user can inform the borrower login information of the cloud server 300. When the borrower uses an electronic device 310 to successfully log in the cloud server 300, the cloud server 300 transmits a packet 302 comprising a backup comparison authentication code AC1' to the electronic device 310, and marks the backup comparison authentication code AC1' as used. When the electronic device 310 of the borrower receives the packet 302, the electronic device 310 transmits the packet 302 to the execution end device 110. When the first control unit 114 determines that the backup comparison authentication code AC1' corresponds to one of the at least one backup comparison authentication code AC1'~ACn' stored in the execution end device 110, it means that the electronic device 310 of the borrower passes the authentication. The backup comparison authentication code AC1' stored in the execution end device 110 is also marked as used. Therefore, the first control unit 114 can perform a predetermined operation, such as performing a predetermined operation to unlock the protected device or resetting the electronic device 310 and the execution end device 110, in order to allow the electronic device 310 to control the execution end device 110 to perform the predetermined operation. The number of the borrower can be one or more than one, and the number of the electronic device 310 can be one or more than one. The present invention is not limited thereto.

In addition, the packet 302 can further comprise other information related to authentication. For example, the packet 302 can further comprise an expiration information of the backup comparison authentication code AC1', so as to prevent the electronic device 310 controlling the execution end device 110 to perform the predetermined operation after the backup comparison authentication code AC1' has expired. Furthermore, the packet 302 can further comprise the international mobile equipment identity number of the control end device 120, so as to ensure that the electronic device 310 is authorized by the control end device 120. Since the packet 302 is generated via a predetermined mechanism, the electronic device 310 can not open the packet 302, such that the authentication information in the packet 302 can be prevented from being obtained by the borrower.

According to the above arrangement, the user can lend the protected device to the borrower. The borrower can use the electronic device 310 to control the execution end device 110 to perform the predetermined operation before the expiration date set by the user, and the user does not need to worry about unable to retrieve the control of the protected device.

Figure 4:
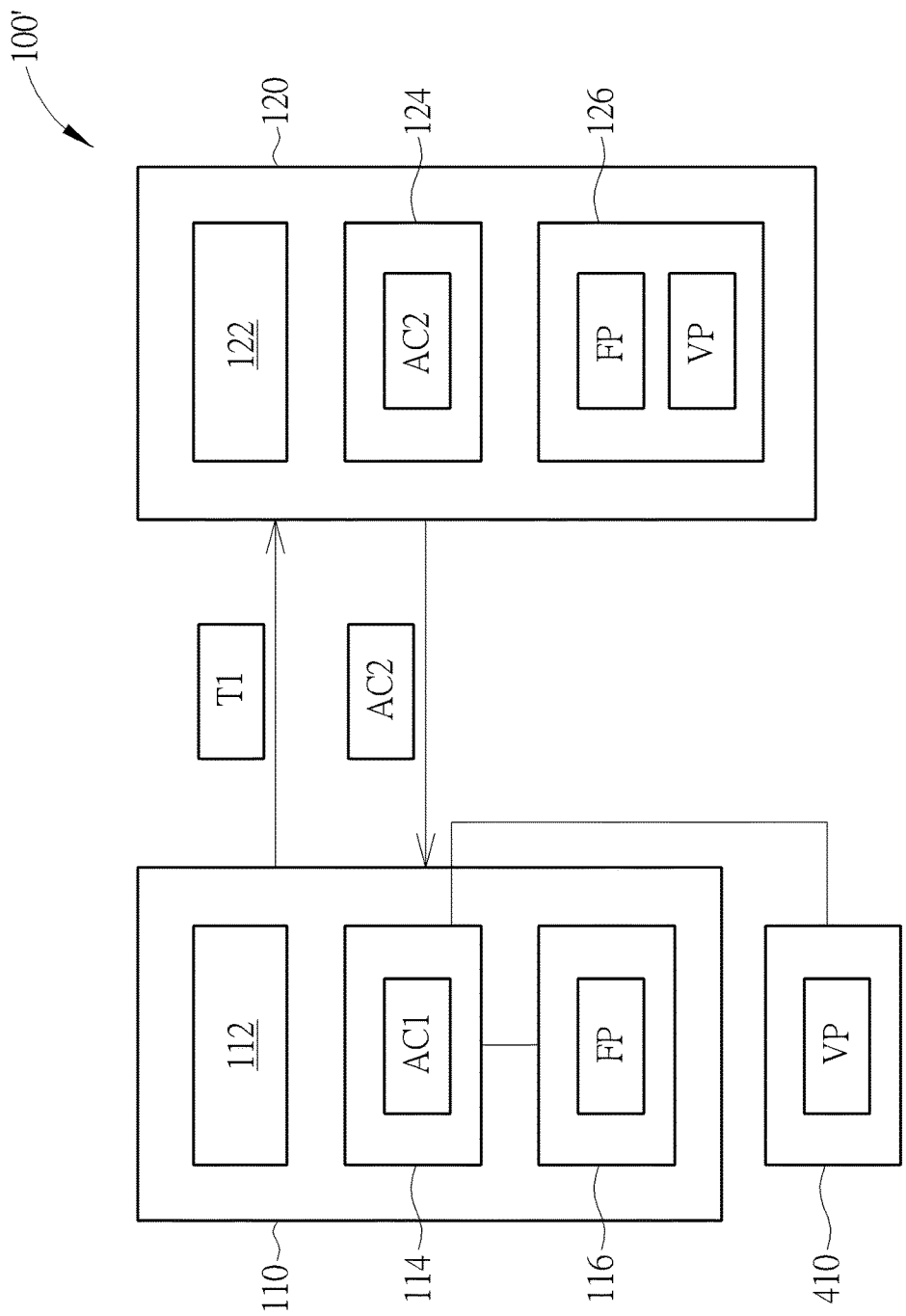
FIG. 4 is a diagram showing a wireless authentication system according to a second embodiment of the present invention.

Please refer to FIG. 4. FIG. 4 is a diagram showing a wireless authentication system according to a second embodiment of the present invention. As shown in FIG. 4, in contrast to the embodiment in FIG. 1, the variable password VP required by the execution end device 110 is pre-stored in an external memory 410 (such as a memory of a trip computer on a car or a memory of other circuits). The external memory 410 is coupled to the execution end device 110, such that the variable password VP can be prevented from being stolen due to crack of the execution end device 110. Furthermore, the variable password VP is stored in the external memory 410 after changed. On the other hand, in another embodiment of the present invention, the fixed password FP can be also stored in the external memory 410, and the variable password VP is stored in the first memory unit 116.

In contrast to the prior art, the wireless authentication system and the wireless authentication method of the present invention perform the authentication by comparing the execution authentication code AC1 and the comparison authentication code AC2 generated from the time related random code T1, the fixed password FP and the variable password VP, or comparing the decrypted time related random code, the decrypted fixed password and/or the decrypted variable password respectively with the time related random code T1, the fixed password FP and/or the variable password VP, in order to have both advantages of static password authentication and dynamic password authentication. Therefore, the wireless authentication system and the wireless authentication method of the present invention can enhance the authentication security.

Those skilled in the art will readily observe that numerous modifications and alterations of the device and method may be made while retaining the teachings of the invention.

What is claimed is:

1. A wireless authentication system for a protected device with memory, comprising:
    an execution end device, which is arranged for connecting to the protected device for unlocking the protected device, comprising:
        a first wireless module for receiving an activation signal; and
        a first control unit coupled to the first wireless module, wherein the first control unit comprises means for generating a time related random code when the first wireless module receives the activation signal; and
    a control end device comprising:
        a second wireless module wirelessly linked to the first wireless module; and
        a second control unit coupled to the second wireless module, wherein the first control unit transmits the time related random code to the second wireless module via the first wireless module;
    wherein when the second wireless module receives the activation signal and the time related random code, the second control unit generates a comparison authentication code according to the time related random code, a fixed password and a variable password, and wherein the second control unit transmits the comparison authentication code to the first wireless module via the second wireless module; and
    wherein when the comparison authentication code corresponds to a set of data stored in the execution end device, the first control unit is arranged for performing a predetermined operation to unlock the protected device, and the variable password is changed,
    wherein the set of data comprises the time related random code, the fixed password and the variable password stored in the execution end device, the first control unit is further configured to decrypt the comparison authentication code in order to obtain a decrypted time related random code, a decrypted fixed password and a decrypted variable password, and when the first control unit determines that the decrypted time related random code, the decrypted fixed password and the decrypted variable password respectively correspond to the time related random code, the fixed password and the variable password stored in the execution end device, the first control unit is arranged for performing the predetermined operation to unlock the protected device.

2. The wireless authentication system of claim 1, wherein the fixed password is pre-stored in the execution end device and the control end device, the variable password is pre-stored in an external memory and the control end device, and the external memory is coupled to the execution end device.

3. The wireless authentication system of claim 1, wherein the variable password is pre-stored in the execution end device and the control end device, the fixed password is pre-stored in an external memory and the control end device, and the external memory is coupled to the execution end device.

4. The wireless authentication system of claim 1, wherein the time related random code comprises a first time information, wherein the first control unit is further configured to determine whether transmission time of the comparison authentication code expires according to the first time information and receiving time of the comparison authentication code.

5. A wireless authentication method for a protected device with memory, comprising the steps of:
    providing an execution end device, which is connected to the protected device for unlocking the protected device, comprising a first wireless module and a first control unit coupled to the first wireless module;
    providing a control end device comprising a second wireless module and a second control unit coupled to the second wireless module;
    transmitting an activation signal to the first wireless module and the second wireless module;
    when the first wireless module receives the activation signal, the first control unit generating a time related random code, and transmitting the time related random code to the second wireless module via the first wireless module;

when the second wireless module receives the activation signal and the time related random code, the second control unit generating a comparison authentication code according to the time related random code, a fixed password and a variable password, and transmitting the comparison authentication code to the first wireless module via the second wireless module; the first control unit determining whether the comparison authentication code corresponds to a set of data stored in the execution end device;

and when the first control unit determines that the comparison authentication code corresponds to the set of data stored in the execution end device, the first control unit executing a predetermined operation to unlock the protected device, and the variable password being changed; wherein the set of comprises the time related random code, the fixed password and the variable password stored in the execution end device, wherein the wireless authentication method further comprising:

the first control unit decrypting the comparison authentication code in order to obtain a decrypted time related random code, a decrypted fixed password and a decrypted variable password, wherein when the first control unit determines that the decrypted time related random code, the decrypted fixed password and the decrypted variable password respectively correspond to the time related random code, the fixed password and the variable password stored in the execution end device, the first control unit is arranged for performing the predetermined operation to unlock the protected device.

6. The wireless authentication method of claim 5, wherein the time related random code comprises a first time information, wherein the first control unit is further configured to determine whether transmission time of the comparison authentication code expires according to the first time information and receiving time of the comparison authentication code.

7. The wireless authentication method of claim 5, wherein the variable password is changed by the first control unit or the second control unit, the wireless authentication method further comprises the first control unit transmitting the changed variable password to the second wireless module via the first wireless module, or the second control unit transmitting the changed variable password to the first wireless module via the second wireless module.

8. The wireless authentication method of claim 5, further comprising: generating at least one backup comparison authentication code; storing the at least one backup comparison authentication code in a cloud server and the execution end device; when an electronic device successfully logs in the cloud server, the cloud server transmitting a packet comprising the at least one backup comparison authentication code to the electronic device; the electronic device transmitting the packet to the execution end device; the first control unit determining whether the at least one backup comparison authentication code in the packet corresponds to the at least one backup comparison authentication code stored in the execution end device; and when the first control unit determines that the at least one backup comparison authentication code in the packet corresponds to the at least one backup comparison authentication code stored in the execution end device, the first control unit performing a predetermined operation.

9. The wireless authentication method of claim 8, wherein the packet further comprises an international mobile equipment Identity (IMEI) number of the control end device, the wireless authentication method further comprises the first control unit determining whether the international mobile equipment Identity number in the packet corresponds to a predetermined international mobile equipment Identity number stored in the execution end device.

* * * * *